Sept. 4, 1956 L. L. GORDON 2,762,008
RECTIFIER
Filed March 22, 1955
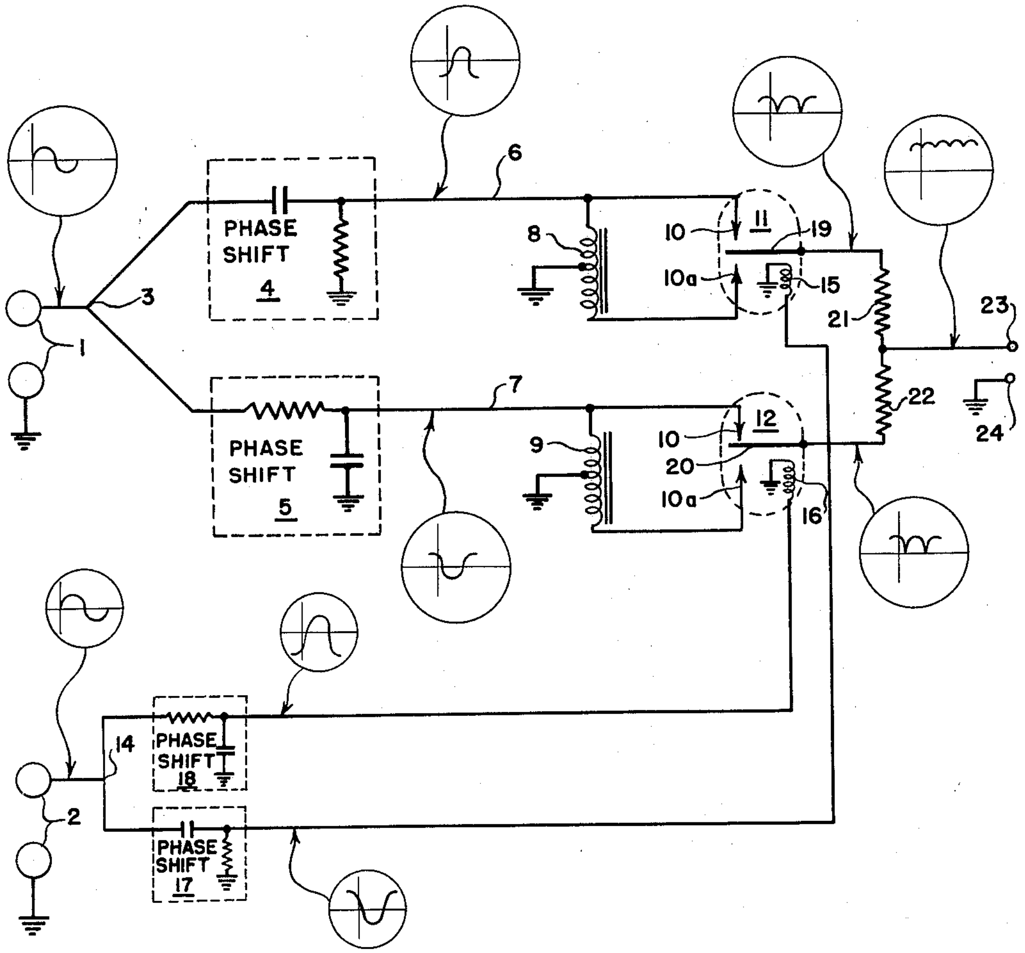
INVENTOR
Lloyd L. Gordon
BY
Pennie, Edmonds, Morton
Barrows & Taylor ATTORNEYS United States Patent Office 2,762,008

Patented Sept. 4, 1956

2,762,008

RECTIFIER

Lloyd L. Gordon, Eau Gallie, Fla., assignor to Electronic Associates, Inc., Long Branch, N. J., a corporation of New Jersey Application March 22, 1955, Serial No. 495,913

6 Claims. (Cl. 321—27)

This invention relates to alternating current rectifiers and more particularly to rectifiers especially suited for use in applications wherein alternating current signals of varying amplitudes are required to be changed to direct current signals having amplitudes substantially proportional to the amplitudes of the alternating currents.

There are many situations requiring rectifiers capable of converting a varying alternating current signal into a substantially pure direct current signal which cannot be met by conventional rectifier circuits. As is commonly necessary, the problem of removing residual alternating or pulsating componenets of the rectified current, known as ripple frequencies, must be met in order to produce a substantially pure direct current output. In ordinary applications this may be accomplished by the use of a rectifier followed by a filter having a long time constant, as is well known. In some instances, however, the use of a filter having a sufficiently long time constant to eliminate to the desired degree the ripple frequencies in the rectified current simultaneously introduces a very large and intolerable time delay in the response of the rectifier circuit to changes in amplitude of the input signal. In the alternative a filter having a tolerable time delay is incapable of reducing the residual ripple frequencies to an acceptable level. Furthermore, conventional rectifying systems are capable only of producing a D. C. output signal of fixed polarity and the amplitude of the output signal is only incidentally related to the amplitude of the input signal. There are some rectifier applications in which neither of these characteristics is acceptable, but, on the contrary, in which the polarity of the D. C. output signal must be variable, and in addition the amplitude of the output signal must closely follow the amplitude of a varying input signal without appreciable lag. These problems are the more difficult when the A. C. input voltage is of a relatively low frequency, as for example in servo amplifier systems.

I have invented a rectifier which is capable of producing a direct current output signal the amplitude of which closely follows the amplitude of a varying alternating current input signal. My new rectifier minimizes to a high degree the residual ripple frequencies usually found in the output signals of rectifiers. Consequently, very little additional filtering of the output signal is necessary, if at all. Because of the smoothing action of the rectifier itself, any additional filtering required to insure a substantially pure D. C. output signal may be secured with a filter having a time constant sufficiently small that it does not interfere with the desired response of the system to variations in the A. C. input signal. All of these desirable features of my novel rectifier circuit are obtained with inexpensive and durable components in simple circuits which inherently require little or no adjustment or maintenance for proper operation over extended periods of time.

According to my invention an incoming alternating current signal to be rectified is impressed on each of a plurality of parallel paths. Each of these paths includes means for displacing the phase of the impressed signal by a predetermined amount with respect to the original signal, the means in any one path being adapted to advance or retard the signal in that path by an amount difference from that in any other path. The advanced or retarded signal in each path is then fed to a rectifying means in the path. The rectified output signals of all paths are subsequently combined through suitable impedance means to effect a single D. C. output signal. This combined output signal may then be filtered if desired to remove any residual ripple frequencies. However, in all but exceptional cases this will not be necessary for the reason that the ripple frequency of the combined output signals is, due to the phase shifting in the separate paths, a multiple of the frequency of the alternating current input signal, and because of the phase displaced superposition of the signals from the separate paths, the amplitude of the residual ripple frequencies in the combined output signal is reduced to very small values.

For a complete understanding of my invention, attention is directed to the following detailed description of a particular embodiment wherein reference is made to the accompanying drawing which is a schematic representation of a rectifying system. In this drawing the phases and amplitudes of the voltages at various points of the circuit are indicated for one condition of operation.

A particular embodiment of my invention selected for description here comprises a signal input channel and a reference input channel, the input to the signal channel being at the pair of terminals 1 and the input to the reference channel being at the pair of terminals 2. One terminal of each pair is connected to ground as indicated in the drawing. The voltage impressed on the reference channel at 2 is of the same frequency and is either in phase or 180° out of phase with the signal channel voltage impressed on the terminals 1 and may be derived from the signal source itself if desired.

The signal channel divides into two branches at 3. One of these branches is connected to a suitable phase shifting device, schematically represented at 4, which is adapted to advance the phase of a signal by a predetermined amount, say 45 electrical degrees in this embodiment of the invention. The signal is also fed from the point 3 to a second phase shifting device, represented schematically at 5, which is adapted to retard the phase of the signal by a predetermined amount which is, in this embodiment, made equal in magnitude to the 45 degrees advance effected by the phase shifting device 4. The phase shifting devices are conventional and may be of any desired form to accomplish the purpose.

The phase shifted outputs are then connected through conductors 6 and 7 to one of the end taps of center tapped inductors 8 and 9, respectively, the center taps of the inductors being connected to ground as indicated in the drawing.

Rectification of the phase shifted signal componenets in the two parallel paths of the signal channel is effected by mechanical-magnetic vibrator type rectifiers 11 and 12. Preferably, each of these rectifiers is of the full-wave type as represented in the drawing and has its stationary contact points 10 and 10*a* connected to the opposite ends of the inductor 8 or 9 in its respective branch of the signal channel.

The rectifiers 11 and 12 are driven by an alternating current reference voltage introduced at the terminals 2. This reference voltage has the same frequency as the signal input voltage introduced at the terminals 1 and, in this embodiment, the two voltages are in phase. In a manner similar to that employed in the signal channel, the reference voltage is divided at the point 14 and connected to the driving coils 15, 16 of the rectifiers through phase shifting devices 17 and 18. The phase shifting device 17 is adapted to advance the phase of the reference voltage to energize the driving coil 15 of the rectifier 11 and cause the vibrating contact 19 of that rectifier to operate in step with the phase advanced signal current at the stationary contacts of the rectifiers. Similarly, the phase shifting device 18 is adapted to retard the phase of the reference voltage by an amount sufficient to energize the driving coil 16 of the rectifier 12 and cause the vibrating contact 20 thereof to operate in step with the phase retard signal voltage at the stationary contacts of the rectifier 12.

The rectified output voltages of the rectifiers 11 and 12 are then recombined through an impedance network which may simply comprise two resistances 21 and 22. Each of these resistances is connected to the output terminal of a rectifier, the resistance 21 being connected to the rectifier 11 and the resistance 22 being connected to the rectifier 12. The resistances have a common connection as at 23 which constitutes the output terminal of the rectifying system. It is understood, of course, that a connection 24 to ground is required to form a complete circuit.

The output terminals 23, 24 may be directly connected to an amplifier or other component or may be connected through a suitable filter if it is desired to remove the last traces of residual ripple frequencies from the rectified current.

The operation of the rectifier described above is simple and straightforward. The incoming signal voltage is divided and the components are introduced into the phase shifting devices 4 and 5. The outputs of these devices are respectively a signal having its phase advanced by 45 degrees with respect to the original signal and a signal having its phase retarded by 45 degrees with respect to the original signal. The frequency of these signals is not altered by the phase shifting devices. The two signals are then fed to the rectifiers in the parallel branches of the signal circuit which rectifiers are operated in step with the phase shifted signals. The latter is accomplished by energizing the rectifiers with the reference voltage components which are advanced and retarded in phase respectively by the devices 17 and with respect to the reference voltage applied at the terminals 2.

The output voltages of the rectifiers are D. C. voltages having a ripple frequency of twice the frequency of the original signal applied at the input terminals 1. The various connections are, of course, made such that the polarity of the output voltages from the rectifiers 11 and 12 are the same. The rectified voltages are then combined through the resistances 21 and 22 which results in a single output voltage for the system. This latter voltage has an amplitude which is directly proportional to the signal input voltage, but the ripple frequency of the composite output voltage is four times the frequency of the input voltage. This results from the phase displacements of the ripple frequencies of the output voltages of the rectifiers 11 and 12; thus, in combining the voltages, the peaks of the ripple frequency of the output voltage of rectifier 11 are effectively 90 degrees ahead of the peaks of the output voltage of rectifier 12. As previously stated, the result is a D. C. voltage having a ripple frequency four times the frequency of the A. C. signal voltage applied at terminals 1. An immediate consequence is that the amplitude of the ripple frequency of the output voltage at terminals 23 and 24 is reduced to a very low value. Therefore, if it is found that additional filtering is required, the time constant of the filter need be very low with a consequent small time delay in the response of the circuit to changes in the amplitude of the signal voltage. It is apparent that the rectifier circuit itself introduces very little delay of that kind.

In relation to the embodiment described above it was stated that the reference voltage applied at the terminals 2 and the signal voltage applied at the terminals 1 are in phase. It will be at once apparent that the rectifier circuit according to my invention will operate equally well if the signal voltage and reference voltage are 180° out of phase. The choice of conditions will depend on the particular application, or in some cases the relative polarity of the two voltages may be made to depend on the operation or condition of operation of some other device related to the system of which the rectifier circuit is a part.

The principle underlying the rectifier circuit of my invention having been made clear in the description of one embodiment, it is immediately apparent that my invention may be embodied in a rectifier circuit having any number, either odd or even, of parallel circuits in the signal and reference channels as desired. Of course, it is not necessary that the voltages in the signal and reference channels be advanced and retarded by 45 degrees as described above, but may be given any other suitable phase angles with respect to the voltages applied at the terminals 1 and 2. Where the signal and reference channels are divided into three or more paths, for example, it is advantageous, although not essential, that the amounts by which the phases of the voltages in the several paths of each channel are separated be made equal. It will be understood that the voltage in a given path of the reference channel must be advanced or retarded by substantially the same phase angle as the signal voltage in the path having the rectifier driven by the reference voltage in the path in question.

While the particular embodiment illustrated in the drawing is satisfactory for many purposes, the apparent advantage of dividing the signal and reference channels into three or more paths is that the frequency of the residual ripple in the output voltage of the rectifier circuit is increased by a larger factor and the amplitude of the ripple is even further reduced than in the two-path embodiment described above. The consequence of this is that subsequent filtering of the output voltage of the rectifier circuit is made even less necessary, but if additional filtering is found to be desirable, a filter having a very short time constant will be completely effective for the purpose. As previously stated, the shorter the time constant of the filter, the more able the rectifier circuit will be to respond rapidly to variations in the amplitude of the signal voltage impressed at the terminals 1.

Thus, I have invented an alternating current rectifier particularly suited to produce a substantially pure D. C. output voltage from a relatively low frequency A. C. input although it may equally well be used for any frequencies to which the vibrator rectifiers will respond. The polarity of the output voltage is at all times dependent on the relative phase of the signal voltage with respect to the reference voltage and the amplitude of the output voltage is constantly proportional to the amplitude of the input voltage.

I have described in detail only one embodiment of my invention. It will be apparent to those skilled in the electrical art that many variations may be made therein without departing from the scope of my invention as defined in the subjoined claims.

I claim:

1. Rectifying apparatus comprising a source of alternating current to be rectified, first and second rectifiers of the magnetically driven vibrator type, first phase shifting means interposed between said source and said first rectifier for advancing the phase of the source voltage supplied to said first rectifier, second phase shifting means interposed between said source and said second rectifier for retarding the phase of the source voltage supplied to said second rectifier, means for energizing said rectifiers to operate substantially in phase with the phase shifted voltages supplied to said rectifiers, and means for combining the rectified output voltages of said rectifiers.

2. Rectifying apparatus comprising input terminals for an alternating voltage to be rectified, first and second full wave rectifiers of the magnetically driven vibrator type, a first phase shifting network interposed between said input terminals and said first rectifier for advancing by 45 electrical degrees the phase of the voltage supplied to said first rectifier, a second phase shifting network interposed between said terminals and said second rectifier for retarding by 45 electrical degrees the phase of the voltage supplied to said second rectifier, a source of alternating voltage for actuating said rectifiers, phase shifting networks interposed between said source and said rectifiers for causing said rectifiers to operate in step with the phase shifted voltages supplied thereto to be rectified, and a resistive network for combining the rectified output voltages of said rectifiers.

3. A rectifier comprising input terminals for an alternating voltage to be rectified, first and second rectifiers of the magnetically driven vibrator type, a first resistance-capacitance network connected between said input terminals and said first rectifier for advancing the phase of the voltage supplied to said first rectifier, a second resistance-capacitance network connected between said input terminals and said second rectifier for retarding the phase of the voltage supplied to said second rectifier, a source of voltage for actuating said rectifiers, phase shifting networks connected between said source and said rectifiers for causing said rectifiers to operate in step with the phase shifted voltages supplied thereto to be rectified, and a resistive network for combining the rectified output voltages of the rectifiers.

4. Rectifying apparatus comprising input terminals for an alternating voltage to be rectified, first and second rectifiers of the magnetically driven vibrator type, first and second phase shifting networks connected between said terminals and said first and second rectifiers respectively, said networks being adapted to advance and retard respectively by substantially equal amounts the phase of the voltages supplied therethrough to the rectifiers, a source of alternating reference voltage for said rectifiers, phase shifting means connected between said source and said rectifiers to cause said rectifiers to operate in substantial phase coincidence with the voltages supplied through said networks, and means for combining the rectified output voltages of said rectifiers.

5. In a servo amplifying system having a signal voltage channel and a reference voltage channel, a rectifying system comprising a pair of parallel paths connected in said signal channel, the first of said paths having means adapted to advance the phase of said signal voltage by a predetermined amount and a first magnetic-mechanical vibrator rectifier for rectifying the phase advanced voltage, the second of said paths having means adapted to retard the phase of said signal voltage by a predetermined amount and a second magnetic-mechanical vibrator rectifier for rectifying the phase retarded voltage, means connected between said reference channel and said first and second rectifiers for energizing the rectifiers to operate substantially in step with the phase advanced and retarded voltages in said paths respectively, and impedance means for combining the rectified output voltages of said rectifiers into a common output voltage for said rectifying system.

6. An alternating current rectifier circuit comprising a signal voltage channel having a pair of signal voltage input terminals and a plurality of parallel paths connected thereto, each path including means for shifting the phase of an A. C. voltage applied to said signal terminals by an amount different from the amount by which the phase of the applied voltage is shifted in any other path, a vibrator type rectifier means for each path of said signal channel, a pair of reference voltage input terminals, and a connection between said reference terminals and each of said rectifiers, each of said connections including means for shifting the phase of an A. C. reference voltage applied to said reference terminals to cause the rectifier to operate substantially in step with the phase shifted signal voltage supplied to said rectifier, and means for combining the rectified output voltages of all of said rectifiers.

References Cited in the file of this patent

UNITED STATES PATENTS

| | | |
|---|---|---|
| 2,096,824 | Price | Oct. 26, 1937 |
| 2,340,098 | Zuhlke | Jan. 25, 1944 |
| 2,410,974 | Huetten | Nov. 12, 1946 |